May 4, 1965   J. J. BRAND   3,181,392
GLASS DRAWING APPARATUS
Filed Aug. 24, 1960   5 Sheets-Sheet 1

INVENTOR
JAY J. BRAND
BY Oscar L. Spencer
ATTORNEY

May 4, 1965  J. J. BRAND  3,181,392
GLASS DRAWING APPARATUS
Filed Aug. 24, 1960  5 Sheets-Sheet 2

INVENTOR
JAY J. BRAND

BY Oscar H. Spencer
ATTORNEY

May 4, 1965  J. J. BRAND  3,181,392
GLASS DRAWING APPARATUS
Filed Aug. 24, 1960  5 Sheets-Sheet 3

INVENTOR
JAY J. BRAND
BY
Oscar H. Spencer
ATTORNEY

May 4, 1965 J. J. BRAND 3,181,392
GLASS DRAWING APPARATUS
Filed Aug. 24, 1960 5 Sheets-Sheet 4

INVENTOR
JAY J. BRAND
BY
Oscar L. Spencer
ATTORNEY

INVENTOR
JAY J. BRAND
Oscar L. Spencer
ATTORNEY

United States Patent Office 3,181,392
Patented May 4, 1965

3,181,392
GLASS DRAWING APPARATUS
Jay J. Brand, Pittsburgh, Pa., assignor to Pittsburgh Plate Glass Company, Pittsburgh, Pa., a corporation of Pennsylvania
Filed Aug. 24, 1960, Ser. No. 51,585
4 Claims. (Cl. 74—665)

This invention relates to glass drawing apparatus and more particularly to an improved apparatus for rotating each roll of a series of pairs of drawing rolls at the same speed, while allowing a variation in the spacing between the two rolls of any pair.

Machines employed in the Pennvernon and Fourcault processes of drawing sheet glass employ upright steel housings, or lehrs, above a drawing kiln from which a continuous glass sheet is drawn. Pairs of horizontal asbestos covered drawing rolls are mounted within each upright housing at spaced intervals, one of each pair being a fixed roll and the other a swing roll. The fixed roll of each pair has its bearings rigidly mounted while the swing roll of each pair has its bearings mounted on one side in a housing suspended from a pivotal shaft and on the other side in the depending arm of a bell crank. Counterweighted arms on each side of the upright housing yieldingly bias each swing roll toward the glass sheet to provide the necessary traction to draw the sheet while allowing sufficient flexibility for a drawing operation wherein varying thickness of glass must pass between the rolls. In addition, each roll must be rotatably driven at precisely the same speed to prevent the formation of so-called roll marks, i.e., a marring of the surface of the glass sheet caused by slippage between a drawing roll and the glass sheet, due to a variation in speed among the rolls.

Heretofore, the synchronization of the drawing rolls has been accomplished, to the extent possible, by rotating each fixed roll of the series of pairs of drawing rolls from a common drive shaft; and by connecting for concurrent rotation, by means of chains, a sprocket on each fixed roll shaft with a sprocket on a pivotal shaft associated with each swing roll. A second chain then transmitted the rotation of the pivotal shaft to the swing roll while allowing a variation in the spacing between the rolls. An example of such an arrangement is shown in U.S. Patent No. 2,300,522. Difficulties have been experienced because sufficiently close tolerances are difficult to attain with chain and sprocket systems to prevent excessive wear. Consequently, an unsatisfactory amount of play would develop in the transmission system making it impossible to maintain synchronization among the rolls. In addition, since the chain drives are continually exposed, dirt, chips of glass, and other foreign material tend to foul the transmission system, necessitating repairs. Moreover, such systems require frequent lubrication and inspection to assume proper operation. Still another shortcoming of the prior art is that swinging of the swing roll causes the roll to slightly accelerate and decelerate so that its speed will not be identical to that of the fixed roll. This presents a danger of producing roll marks on the glass which makes the glass unsuitable for use.

The present invention overcomes the above-mentioned disadvantages of the prior art while maintaining the speed of the rolls substantially constant during movement of the swing roll. This is accomplished by driving the fixed roll, a pivotal shaft from which the swing roll is driven, and the swing roll of each pair of drawing rolls at the same speed through close tolerance gearing which greatly reduces wear, which is capable of being housed against dirt and foreign matter, and which is not adversely affected by a canting of the swing roll during the drawing process. The fixed roll rotates in a direction opposite to the pivotal shaft and the swing roll.

For a better understanding of the invention, reference may be had to the accompanying drawings in which like numerals refer to like parts throughout.

Figure 1:
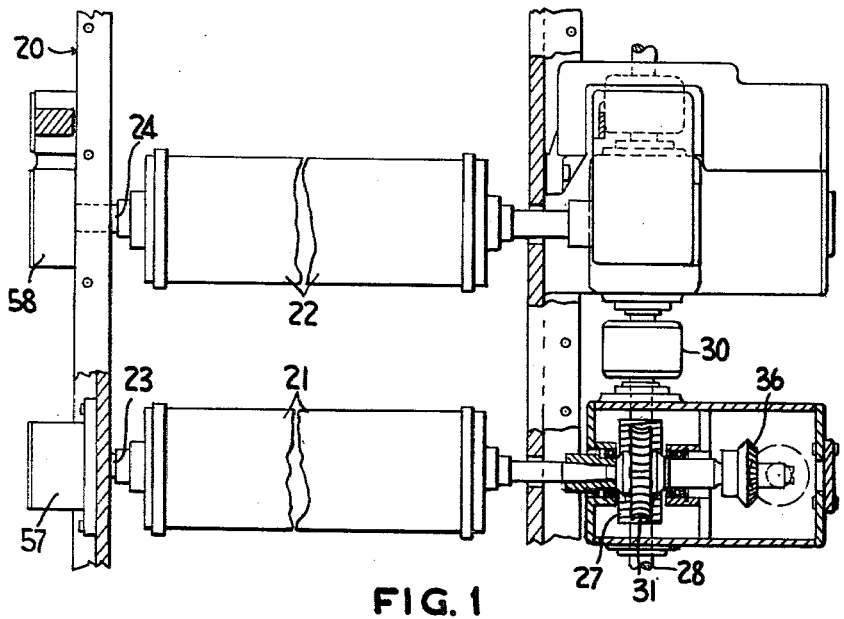
FIG. 1 is a partial view partly in section of a preferred embodiment of the drawing machine taken on line 1—1 of FIG. 3.
Figure 2:
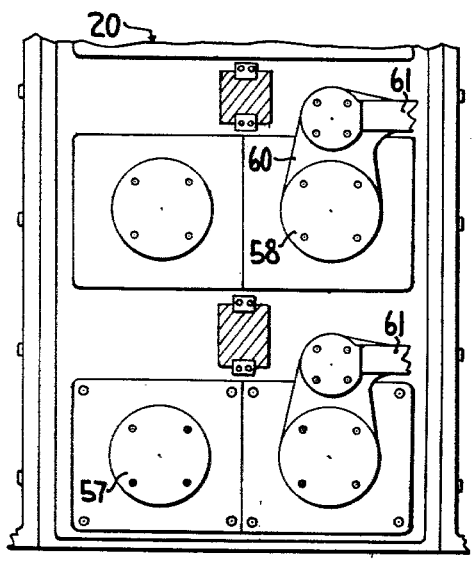
FIG. 2 is a partial side view of the drawing machine looking from the left-hand side of FIG. 1.
Figure 3:
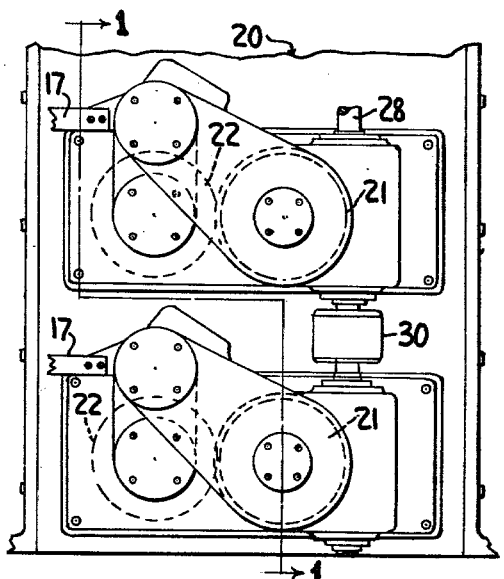
FIG. 3 is a partial side view of the drawing machine looking from the right-hand side of FIG. 1.
Figure 5:
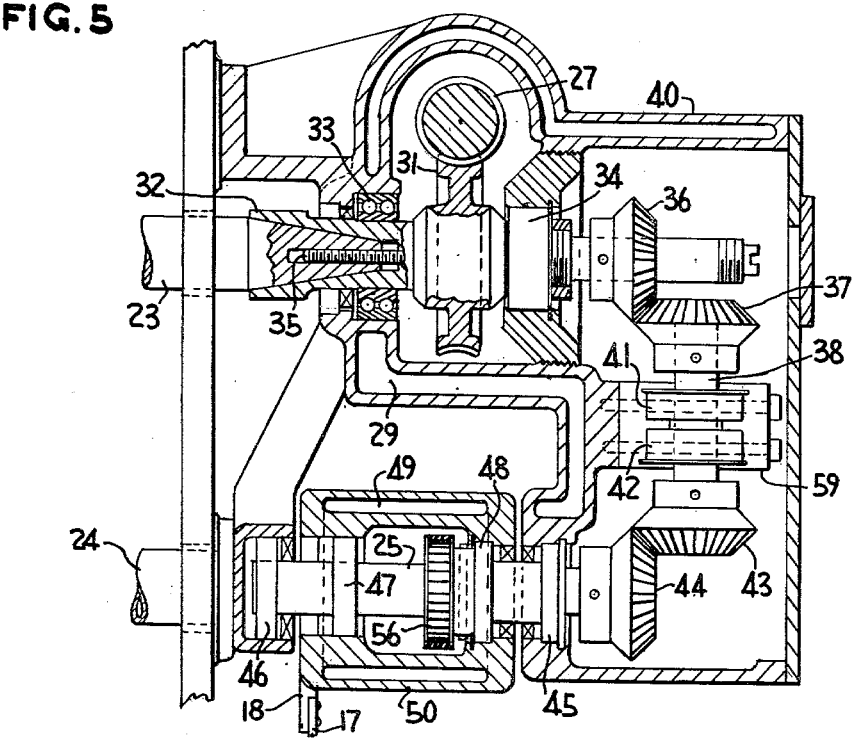
FIG. 5 is a section view taken on line 5—5 of FIG. 4.

Referring now to the drawings, there is shown in FIGS. 1–3 an upright support 20 for housing a series of pairs of drawing rolls adapted to draw a sheet of glass from a molten bath. Each pair of drawing rolls includes a fixed roll 21 rotatably supported by a shaft 23, and a swing roll 22 rotatably supported on a shaft 24. Rotation is imparted to the series of fixed rolls by a sectional power shaft 28 driven by a suitable power source (not shown). Sleeve couplers 30, keyed to adjacent sections of power shaft 28, provide a solid connection therebetween to transmit concurrent rotation to a series of worms 27 on each section of the power shaft. Each worm drives a fixed roll through an associated worm gear 31 fixedly attached to a shaft adapter 32, as best shown in FIG. 5, which receives the tapered end of a fixed roll shaft 23. Since the drive for each pair of drawing rolls is the same, only the drive for one pair need be described in detail.

Figure 4:
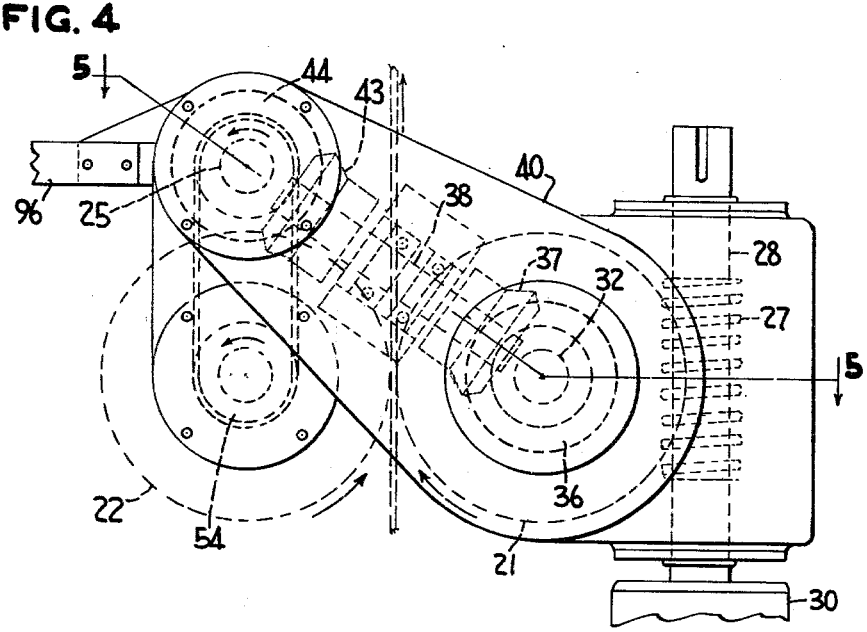
FIG. 4 is a more detailed view of the roll drive shown in FIG. 3, showing the gearing arrangement, the rolls, and the edge of the glass sheet in phantom.

The adapter 32 for the fixed roll shaft 23 is mounted for rotation in bearings 33 and 34 in a housing 40, and a draw bolt 35 couples the adapter with the fixed roll shaft. Parallel to the adapter 32, but displaced both horizontally and vertically therefrom as best shown in FIGS. 4 and 5, is a pivotal shaft 25 supported for rotation in bearings 45 and 46 in housing 40.

Figure 6:
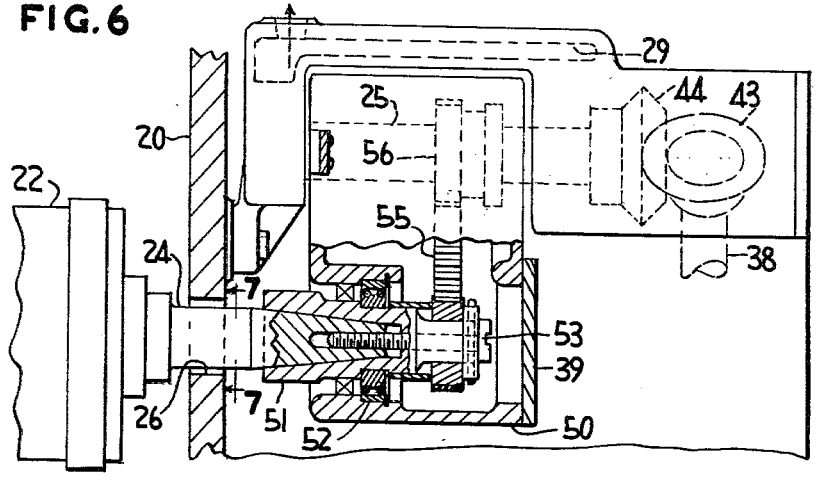
FIG. 6 is a view, partly in section, looking from the left-hand side of FIG. 4.

Referring now to FIGS. 5 and 6, the rotation of the adapter 32 is transmitted from a bevel gear 36 fixed to the outermost end of the adapter, to a bevel gear 44 fixed to the outermost end of pivotal shaft 25, by means of a rotatable connecting shaft 38 having bevel gears 37 and 43 attached to each end and meshing with gears 36 and 44, respectively. The bearings 41 and 42 rotatably support the connecting shaft 38 in a bracket 59 secured within the housing 40.

Figure 7:
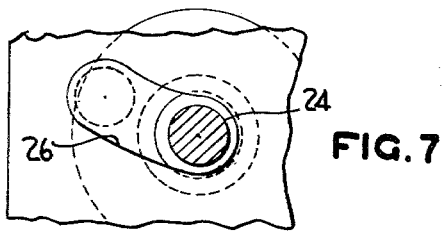
FIG. 7 is a view taken on line 7—7 of FIG. 6 showing the arcuate slot through which the swing roll shaft passes.
Figure 8:
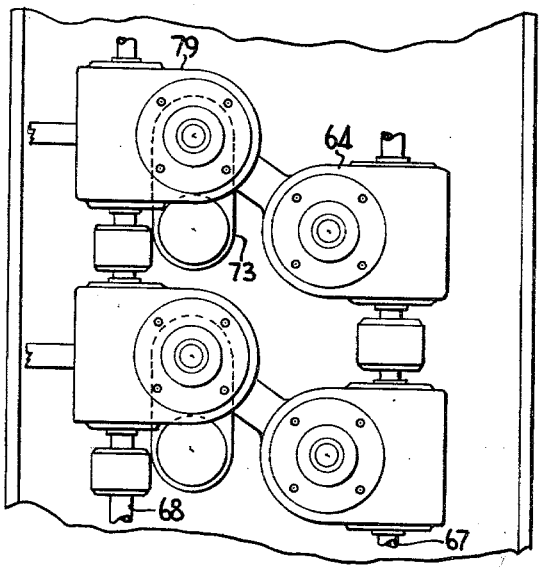
FIG. 8 is a partial side view of the drawing machine, similar to FIG. 3, but illustrating a second embodiment of the roll driving mechanism.

A separate housing 50, depending from and freely pivotable about the shaft 25 on bearings 47 and 48, rotatably supports a shaft adapter 51, as by self-aligning ball bearings 52; and completely encloses a drive transmission consisting of a spur gear 56 fixed to the shaft 25, a spur gear 54 fixed to the adapter 51, and a toothed transmission band, such as a timing belt 55 or a silent chain, for transmitting rotation from the pivotal shaft 25 to the adapter 51. The self-aligning bearings 52 and the flexibility of the transmission band facilitate any canting of the swing roll during the drawing operation. The open end of the adapter 51 extends from housing 50 toward the side of supporting structure 20, and receives the tapered end of swing roll shaft 24, which is secured therein by draw bolt 53. An arcuate slot 26 is formed in each side of the upright supporting structure 20 (one of such slots being illustrated in FIG. 7) to allow arcuate movement of the swing roll shaft.

The supporting and driving mechanism for each pair of drawing rolls is separately housed and securely fastened on each side of the upright support structure 20. On the drive side of the support, housings 40 and 50 completely enclose the drive mechanism of each pair of rolls from dirt, glass chips and other foreign material. The chambers 29 and 49 within the housing walls provide for the circulation of cooling fluid to prevent the transmission system from overheating due to the elevated temperature of the immediate environment. The plates 19 and 39 cover suitable openings in the outermost walls of the housings 40 and 50, respectively, which facilitate replacement of the drawing rolls by providing access to the draw bolts 35 and 53. A weighted arm 17 is attached to an ear 18 on the pivoted housing 50 and biases the swing roll toward the glass being drawn. On the opposite side of the support from the drive mechanism, as best shown in FIG. 2, the housings 57 and 58 suitably journal the roll shafts 23 and 24, respectively. Housing 58 is formed in the dependent portion of a bell crank 60 having a horizontal weighted arm 61 which, with arm 17, yieldingly biases the swing roll toward the glass sheet to provide the necessary traction for the drawing operation.

Figure 12:
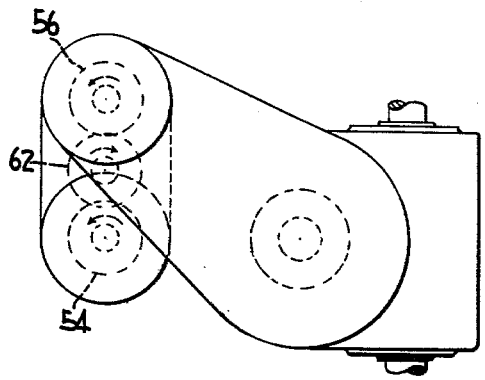
FIG. 12 is a view, similar to FIG. 4, illustrating a modification of the swing roll drive.

A modification of the above described embodiment is shown in FIG. 12 of the drawings. In this modification an idler gear 62, driven by spur gear 56 attached to pivotal shaft 25, meshes in driving relationship with spur gear 54 to transmit the rotation of pivotal shaft 25 to the swing roll shaft 24.

In operation, rotation is supplied to fixed rolls 21 from a suitable power source (not shown) through power shaft 28 and associated gearing to drive the fixed rolls directly at a speed suitable for drawing a sheet of glass from the molten bath below. The gear 36, fastened to the fixed roll adapter, transmits the rotation of the fixed roll 21 to pivotal shaft 25 through gears 37 and 43 which are rotated concurrently on shaft 38, and through gear 44 fastened to the pivotal shaft. A 1:1 ratio between each pair of meshing gears provides the pivotal shaft 25 with rotation at the same speed as fixed roll 21. The swing roll 22 is rotatably driven from gear 56 on pivotal shaft 25 by means of the timing belt 55 or, alternatively, by the idler gear 62, meshing with gear 54 fastened to and swinging with the swing roll adapter in which the swing roll is secured. A 1:1 ratio between gears 56 and 54 provides the swing roll with rotation at the same speed as the pivotal shaft and thus at the same speed as the fixed roll. Since the housing 50 and the bell crank 60, both of which support the swing roll 22, are pivotally supported above the swing roll axis, swing roll 22 can swing about the pivotal axis of the supports in response to varying thicknesses in the glass sheet without adversely affecting the transmission of rotation to the swing roll. The presence of the timing belt 55 or idler gear 62 in the drive to the swing roll will counteract the effect of swinging, so that the swing roll will always maintain a constant rotational speed about its own axis, substantially equal to the speed of the fixed roll.

A modified form of this invention is illustrated in FIGURES 8–11 and 13. The distinguishing feature of this embodiment is that the fixed roll shaft and the pivotal shaft are independently driven from separate, but synchronously rotating, power shafts. Such an arrangement eliminates the need for a connecting drive between the fixed roll and the pivotal shaft of each pair of drawing rolls.

Figure 9:
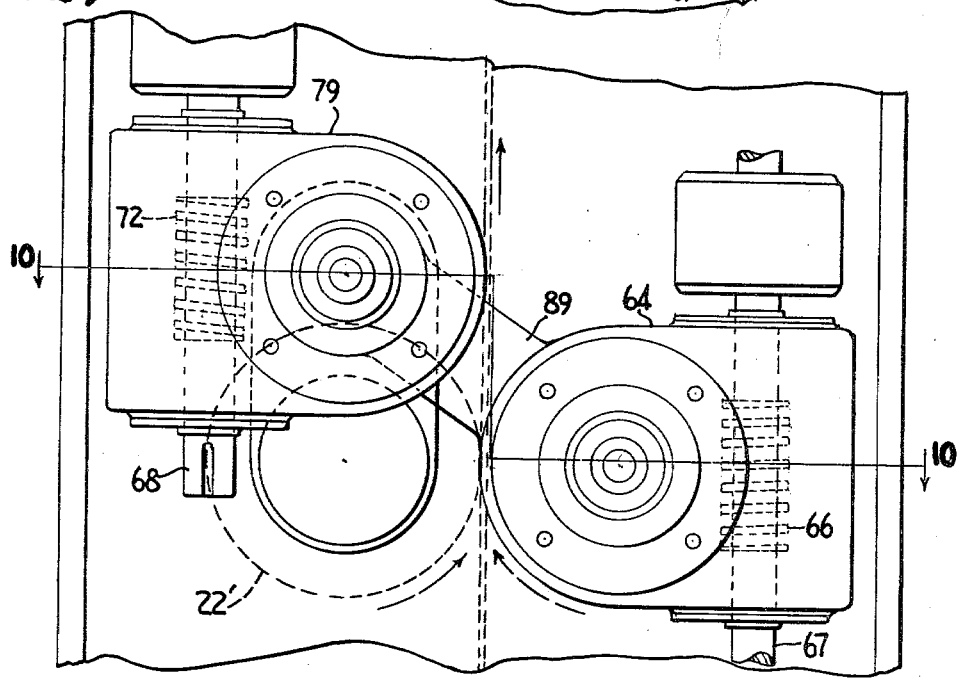
FIG. 9 is a more detailed view of the roll drive shown in FIG. 8, with the gearing arrangement illustrated in phantom.
Figure 10:
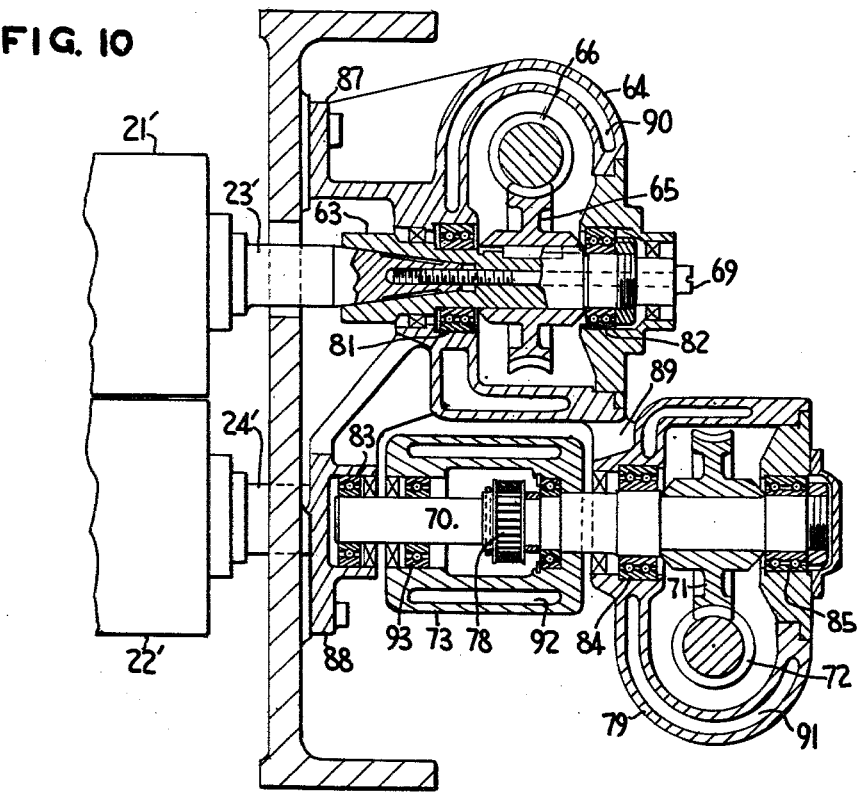
FIG. 10 is a section view taken on line 10—10 of FIG. 9.
Figure 11:
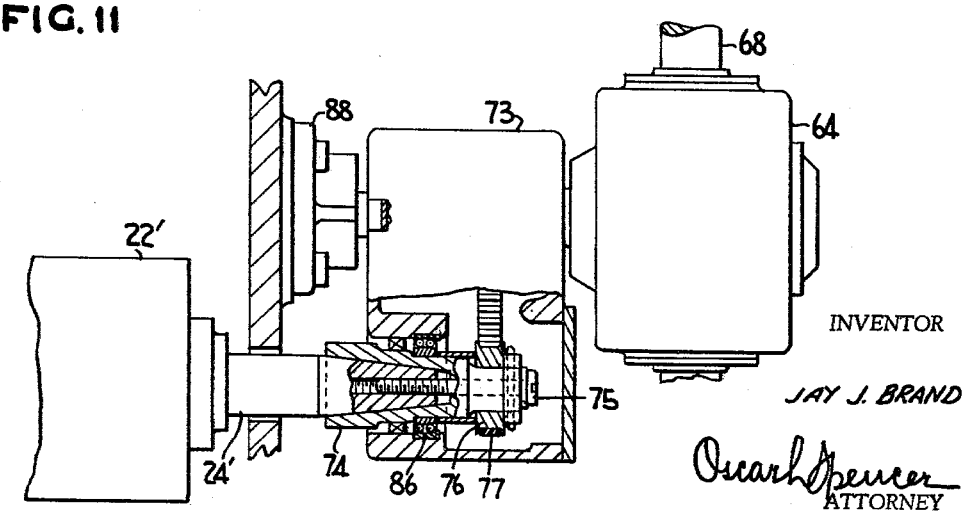
FIG. 11 is a view, partly in section, looking from the left-hand side of FIG. 9.

Referring now to FIGS. 9–11, rotation is imparted to the series of fixed rolls by the sectional power shaft 67 driven by a suitable power source (not shown) in the same manner as in the first embodiment. Thus, a worm 66 on each section of the shaft drives a fixed roll through an associated worm gear 65 fixed to shaft adapter 63 which receives the tapered end of fixed roll shaft 23.

A sectional power shaft 68, with a worm 72 on each section and in all other ways of similar construction to shaft 67, is driven at the same speed as shaft 67 by suitable gearing from a common source of power (not shown) or by a synchronous power source (not shown). Each worm 72 drives a worm gear 71 fixed to a pivotal shaft 70 which is suitably journalled in a housing 79, as by bearings 83, 84 and 85. A separate housing 73 depends from and is pivotally mounted about the shaft 70 for swinging movement by bearings 93 and 94. Within the dependent portion of this housing, an adapter 74 is rotatably supported, as by self-aligning ball bearings 86, and receives the tapered end of swing roll shaft 24' which is secured therein by draw bolt 75. A spur gear 76 is fixedly secured to the end of the adapter 74 opposite the roll shaft to rotate the adapter and shaft, and thus the swing roll 22'. The spur gear 76 is driven, by means of a toothed transmission band, such as a timing belt 77 or a silent chain, from a spur gear 78 fixed for rotation with pivotal shaft 70. The ends of the roll shafts opposite the driving mechanism are supported for rotation and, in the case of the swing rolls, for movement in response to varying thicknesses of the glass sheet in the same manner as in the first embodiment.

A plurality of separate housings 64, 73 and 79 are associated with the drive mechanism of each pair of drawing rolls in the second embodiment. A fixed roll housing 64, enclosing the fixed roll drive mechanism, is secured to the side of upright support 20 by two spaced support members 87 and 88 (see FIG. 10), and itself supports housing 79 by a web member 89. The housing 79 supports one end of the pivotal shaft 70 and houses the driving mechanism therefor, while the other end of shaft 70 is journalled in support member 88. Separate housing 73 pivotally depends from shaft 70 between support member 88 and housing 79, and encloses the drive from the pivotal shaft to the swing roll. As in the first embodiment, suitable cooling chambers 90, 91 and 92 are provided in each housing to prevent the transmission system from overheating.

Figure 13:
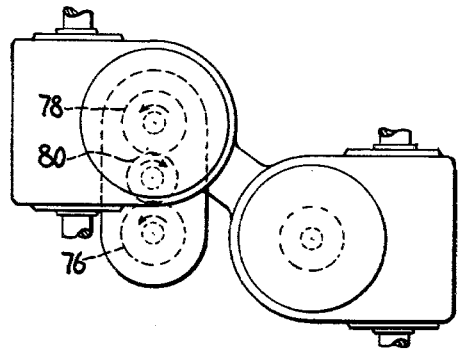
FIG. 13 is a view, similar to FIG. 9, illustrating a modificatoin of the swing roll drive.

A modification of the above described embodiment is shown in FIG. 13 of the drawings. In this modification an idler gear 80, driven by gear 78, meshes in driving relation with gear 76 to transmit the rotation of the pivotal shaft 70 to the swing roll shaft 24'.

In the operation of the second embodiment, each roll of a pair of drawing rolls is independently rotated from a separate power shaft. Thus, fixed roll 21' is driven at a predetermined speed through a direct gearing arrangement from power shaft 67; and swing roll 22' is driven at the same speed from a second power shaft 68 by means of the intermediate pivotal shaft 70. The second power shaft 68 is rotated synchronously with the power shaft 67, and the pivotal shaft 70 is driven directly from this second power shaft through gearing of identical construction to that connecting power shaft 67 to fixed roll 21'. Thus, the pivotal shaft is rotated in the same manner and at the same speed as the fixed roll. The rotation of pivotal shaft 70 is in turn transmitted to the swing roll shaft 24' by means of a separate gear attached to each of the shafts and connected for rotation by the timing belt 77 or the idler gear 80. Since the two gears mounted on the shafts are of similar construction, the swing roll will be driven at the same speed as the pivotal shaft and hence at the same speed as the fixed roll. The housing 73, supporting swing roll 22' and enclosing the drive from the pivotal shaft to the swing roll, is free to pivot about shaft 70 in response to weighted arms and the thickness of the glass sheet being drawn in the same manner as in the first embodiment.

From the foregoing description it will be apparent that the various features of the apparatus combine to provide an accurate, reliable and completely housed drive for maintaining the synchronism of the drawing rolls of a glass sheet drawing machine, while permitting variations in thickness of the glass sheet being drawn to pass between each pair of rolls without danger of breakage and without marring the surface.

It should be understood, of course, that the foregoing disclosure relates to only preferred embodiments of the invention and that it is intended to cover all changes and modifications of the examples of the invention herein chosen for the purpose of the disclosure, which do not constitute departures from the spirit and scope of the invention.

I claim:

1. Apparatus for drawing sheet glass from a molten bath substantially along a predetermined vertical plane comprising, a series of pairs of drawing rolls each rotatably supported by a shaft and normally arranged successively in substantial alignment, one pair above another pair, each pair of rolls including a fixed roll and a swing roll, each shaft having a gear attached thereto, a drive shaft common to all pairs of rolls having thereon gear means to drive said gear attached to the fixed roll shaft of each pair of rolls to rotate all roll shafts at a predetermined speed, a pivotal shaft about which each swing roll is movable in an arcuate path relative to its respective fixed roll to vary the spacing between the rolls of the pair, a first gear mounted on each pivotal shaft, means to drive said first gear mounted on the pivotal shaft to rotate the pivotal shaft at the same speed and in an opposite direction as the fixed roll shaft, a second gear mounted on each pivotal shaft, and means, driven from said second gear and swinging with said swing roll shaft, to drive the gear attached to the swing roll shaft of the pair of rolls at the same speed and in a same direction as the pivotal shaft while allowing said change of spacing between the pair of rolls.

2. The apparatus as set forth in claim 1 wherein the last named means includes a toothed transmission band driven from said second gear and meshing with the gear attached to said swing roll shaft.

3. The apparatus as set forth in claim 1 wherein the last named means includes an idler gear driven from said second gear and meshing with the gear attached to said swing roll shaft.

4. Apparatus for drawing sheet glass from a molten bath substantially along a predetermined vertical plane comprising, a series of pairs of drawing rolls each rotatably supported by a shaft and normally arranged successively in substantial alignment, one pair spaced from another pair, each pair of rolls including a fixed roll and a swing roll, each shaft having a gear attached thereto, a drive shaft common to all pairs of rolls having thereon gear means to drive said gear attached to the fixed roll shaft of each pair of rolls to rotate all fixed roll shafts at a predetermined speed, a pivotal shaft about which each swing roll is movable in an arcuate path relative to its respective fixed roll to vary the spacing between the rolls of the pair, a first gear mounted on each pivotal shaft, a second gear attached to each fixed roll shaft, a connecting shaft for each pair of rolls, a pair of gears fixed for concurrent rotation on each end of each connecting shaft, one of said pair of gears meshing in driven relationship with said second gear of its respective fixed roll shaft, the other of said pair of gears meshing in driving relationship with said first gear of its respective pivotal shaft, means for supporting each connecting shaft for rotation, a second gear mounted on each pivotal shaft, and means swinging with said swing roll shaft, driven from the second gear, mounted on said pivotal shaft, to drive the gear attached to the swing roll shaft of the pair of rolls in a same direction as said second gear while allowing said change of spacing between the pair of rolls.

References Cited by the Examiner
UNITED STATES PATENTS

| | | | |
|---|---|---|---|
| 1,032,238 | 7/12 | Player | 65—196 |
| 1,086,722 | 2/14 | Langston | 101—375 |
| 1,891,373 | 12/32 | Danner | 65—193 |
| 2,084,108 | 6/37 | Redshaw | 49—17 X |
| 2,215,231 | 9/40 | Redshaw | 49—17 |
| 2,300,522 | 11/42 | Redshaw | 49—17 |
| 2,571,239 | 10/51 | Hart | 49—17 |
| 2,693,273 | 11/54 | Kopplin | 226—177 |
| 2,974,447 | 3/61 | Tasher. | |
| 3,068,710 | 12/62 | Beckadolph et al. | 74—229 X |

BROUGHTON G. DURHAM, *Primary Examiner.*